Patented Sept. 1, 1942

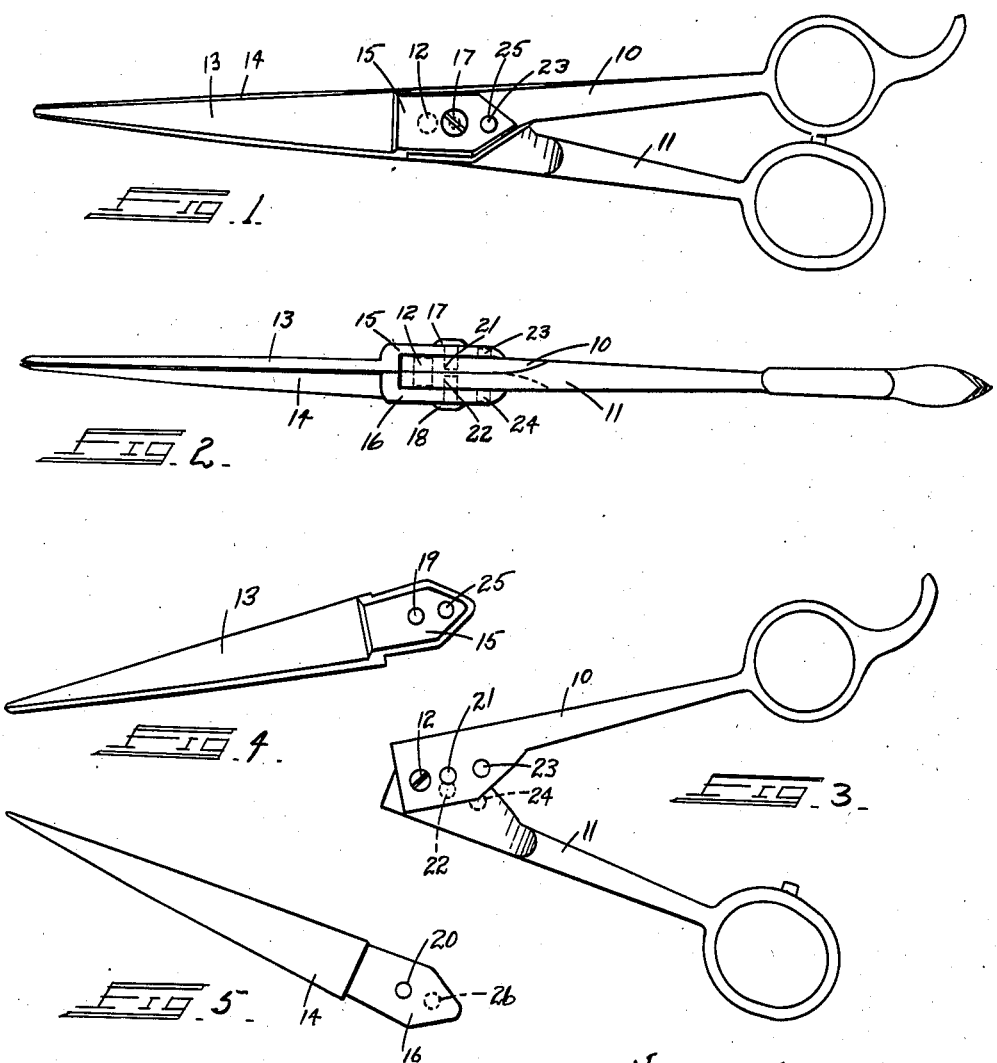

2,294,832

UNITED STATES PATENT OFFICE 2,294,832

SHEARS

Nicholas E. Colla, Jr., Youngstown, Ohio

Application September 25, 1941, Serial No. 412,239

4 Claims. (Cl. 30—260)

This invention relates to shears and more particularly to a pair of shears wherein cutting blades are separately formed and removably attached to the handle portions of the shears.

The principal object of the invention is the provision of a pair of shear handles pivoted to one another and adapted to receive replaceable cutting blades.

A further object of the invention is the provision of a pair of shears wherein either one of the cutting blades may be detached and removed from the handle portions.

A still further object of the invention is the provision of a pair of shears comprising one pair of pivoted handles and several pairs of replaceable blade portions.

The shears shown and described herein have been designed to enable the more positive personalization of shears and particularly barber shears. It is well-known that certain handle formations are particularly adapted to certain hand types and sizes and one of the objects of this invention is, therefore, to provide a pair of shears wherein the handle portions may be and preferably are formed to the individual personal requirements of the person who will use the same and at the same time provide those handles with a plurality of sets of cutting blades such as may be used for hair cutting, hair thinning, manicuring, and other similar and allied uses.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawing, wherein:

Figure 1 is a top plan view of a pair of shears formed in accordance with the invention.

Figure 2 is a side elevation of the shears illustrated in Figure 1.

Figure 3 is a top plan view of the handle portions of the shears illustrated in Figure 1.

Figure 4 is a top plan view of one of the shear blades.

Figure 5 is a bottom elevation of the other one of the shear blades.

By referring to the drawing Figures 1 and 2 in particular, it will be seen that a pair of handles comprising members 10 and 11 are pivoted together by means of a pivot 12 and are provided with a pair of suitably formed shear blades 13 and 14 respectively which shear blades are formed with offset projections 15 and 16 respectively and which projections 15 and 16 provide means for the attachment and alignment of the blades with the handle portions 10 and 11. The blades 13 and 14 are attached to the handle portions 10 and 11 by means of the projections 15 and 16 and a pair of short screws 17 and 18 which pass through openings 19 and 20 in the projections 15 and 16 and engage threaded openings 21 and 22 in the handle members 10 and 11 respectively.

The offset portions 15 and 16 of the shear blades 13 and 14 are preferably formed so that the offset shoulders thereof firmly engage the ends of the handle members 10 and 11 and other means for insuring the accuracy and structural union between the blades and the handles are provided and comprise a pair of oppositely disposed pins 23 and 24 formed on the handle members 10 and 11 respectively and adapted to register with openings 25 and 26 in the projections 15 and 16 of the shear blades.

It will thus be seen that shears formed in accordance with this invention may conveniently have the handle portions thereof shaped to accommodate the individual user's hand and that if desired, the handles may be formed of any one of a number of plastic materials to facilitate this shaping. It will be observed that pairs of suitable and different cutting, thinning, and manicuring, and other blades may be readily affixed to the handles by simply removing the short screws 17 and 18 and disengaging the blade portions from their positions upon the handles and upon the pins 23 and 24.

Shears formed in accordance with this invention possess the desirable characteristics of readily enabling the cutting portions thereof to be sterilized after each use, thus conforming with certain rules and regulations now in effect in the several States. The blade portions may be conveniently clipped together and sterilized in a relatively small sterilizer (not shown) and may readily be placed on the handles with a simple and easy operation thus making available a sanitary shears and at the same time avoiding the necessity of sterilizing the handle portions or of providing duplicate shears for this purpose.

Having thus described my invention, what I claim is:

1. In a pair of shears comprising pivotally connected handle members, blade members formed separately of said handle members and adapted to be secured to each of the handle members, means passed through said blade members and into the said handle members and means formed on said handle members passed through blade members for detachably connecting said blade members with said handle members, said blade members respectively overlying and underlying the pivotal connection of the handle members and being detachably mounted in connection with the handle members without removing the pivotal connection of the said handle members.

2. In a pair of shears comprising a pair of pivoted handles and a pair of replaceable blades, off-set projections formed on said blades and adapted to register with portions of the said handles when the said off-set projections of the said blades respectively underlie and overlie the pivotal connection of the said handles, openings formed in each of the said off-set projections of blades and a threaded opening and a projecting lug formed on each of the said handles adapted to register with said openings in the off-set projections of the said blades, the lugs on each of the handles entering one of the openings on each of the off-set projections, a pair of set screws one positioned through each of the remaining openings in the off-set projections of the blades and engaging the threaded openings in the handles.

3. In a pair of shears comprising a pair of pivoted handles and a pair of replaceable blades, off-set projections formed on the said blades adapted to respectively underlie and overlie the pivotal connection of the said handles, the blades adapted to lie on the same plane with the adjoining portions of the said handles, the adjoining surfaces of the handles and the blades adapted to register and cooperate with means for detachably mounting the blades on the said handle members in holding the said handle members securely in desirable position.

4. In a pair of shears comprising a pair of pivoted handles and a pair of replaceable blades, off-set projections formed on the said blades adapted to respectively underlie and overlie the pivotal connection of the said handles, the blades adapted to lie on the same plane with the adjoining portions of the said handles, the adjoining surfaces of the handles and the blades adapted to register and cooperate with means for detachably mounting the blades on the said handle members in holding the said handle members securely in desirable position, said means comprising a pair of openings formed in each of the said off-set projections of the said blades, a threaded opening and a projecting lug formed on each of the handles and adapted to register with the openings in the said off-set projections of the blades and set screws adapted to be positioned through one of the openings in the off-set projections of each blade and threadedly engage the said threaded opening in the said handle, the said set screw, the projecting lug and the registering ends of the off-set projections of the blades and the end of the handles adapted to detachably secure the blades to the said handles.

NICHOLAS E. COLLA, Jr.